(12) United States Patent
McMahan et al.

(10) Patent No.: US 8,631,075 B2
(45) Date of Patent: Jan. 14, 2014

(54) METHOD AND SYSTEM FOR MANAGING INTERRUPTS IN AN INSTANT MESSAGING APPLICATION

(75) Inventors: Paul F. McMahan, Apex, NC (US); Robert C. Leah, Cary, NC (US); Patrick R. Guido, Cary, NC (US); Kent Fillmore Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2311 days.

(21) Appl. No.: 10/710,913

(22) Filed: Aug. 12, 2004

(65) Prior Publication Data

US 2006/0036688 A1  Feb. 16, 2006

(51) Int. Cl.
*G06F 15/16* (2006.01)

(52) U.S. Cl.
USPC ........................................................ 709/206

(58) Field of Classification Search
USPC ........................................................ 709/206
See application file for complete search history.

(56) References Cited

U.S. PATENT DOCUMENTS

| | | | | |
|---|---|---|---|---|
| 5,611,040 | A * | 3/1997 | Brewer et al. | 715/860 |
| 6,400,951 | B1 * | 6/2002 | Vaara | 455/436 |
| 6,654,790 | B2 | 11/2003 | Ogle et al. | |
| 6,658,095 | B1 | 12/2003 | Yoakum et al. | |
| 2001/0009014 | A1 * | 7/2001 | Savage et al. | 709/204 |
| 2002/0052196 | A1 * | 5/2002 | Padawer et al. | 455/414 |
| 2002/0065894 | A1 | 5/2002 | Dalal et al. | |
| 2002/0087634 | A1 | 7/2002 | Ogle et al. | |
| 2002/0156831 | A1 * | 10/2002 | Suorsa et al. | 709/202 |
| 2002/0194291 | A1 | 12/2002 | Najam et al. | |
| 2003/0055908 | A1 * | 3/2003 | Brown et al. | 709/207 |
| 2003/0063072 | A1 * | 4/2003 | Brandenberg et al. | 345/173 |
| 2004/0083291 | A1 | 4/2004 | Pessi et al. | |
| 2004/0127226 | A1 * | 7/2004 | Dugad et al. | 455/450 |
| 2004/0142703 | A1 * | 7/2004 | Erb et al. | 455/456.1 |
| 2005/0084082 | A1 * | 4/2005 | Horvitz et al. | 379/114.06 |
| 2005/0132011 | A1 * | 6/2005 | Muller et al. | 709/206 |
| 2005/0132014 | A1 * | 6/2005 | Horvitz et al. | 709/206 |
| 2005/0149622 | A1 * | 7/2005 | Kirkland et al. | 709/207 |
| 2005/0220079 | A1 * | 10/2005 | Asokan | 370/352 |
| 2005/0245240 | A1 * | 11/2005 | Balasuriya et al. | 455/414.1 |
| 2006/0026254 | A1 * | 2/2006 | Kessen et al. | 709/207 |

OTHER PUBLICATIONS

Tang, JC. et al, Beyond Instant Messaging, Queue, (Nov. 2003), pp. 29-37.
Miller, Sheryl L., How Do People Manage Interruptions in Complex Decision Making Tasks?, Doctoral Consortium, (CHI 2001), pp. 79-80.

(Continued)

*Primary Examiner* — Jerry Dennison
(74) *Attorney, Agent, or Firm* — Charles L. Moore; Moore & Van Allen PLLC

(57) ABSTRACT

A method for managing interrupts in an instant messaging application may include receiving an interrupt request from an interrupting contact during an instant messaging conversation between at least two contacts. The method may also include interrupting the instant messaging conversation in response to a predetermined one of the interrupting contact having a selected interrupt priority ranking relative to an interrupt priority ranking of each of the at least two contacts or an interrupting conversation having a higher interrupt priority ranking compared to an interrupt priority ranking of the instant messaging conversation.

29 Claims, 5 Drawing Sheets

(56) References Cited

OTHER PUBLICATIONS

Chen, D. and Vertegaal, Roel, Using Mental Load for Managing Interruptions in Physiologically Attentive User Interfaces, (CHI 2004), Vienna, Austria, pp. 1513-1516.

Adamczyk, Piotr, D., et al., If Not Now, When?: The Effects of Interruptions at Different Moments Within Task Execution, (CHI 2004), Vienna, Austria, pp. 271-278.

Muller, Michael J. et al., Introducing Chat into Business Organizations: Toward an Instant Messaging Maturity Model, (2003), pp. 50-57.

Robertson, T.J. et al., Impact of Interruption Style on End-User Debugging, (CHI 2004), Vienna, Austria, pp. 287-294.

Speier, Cheri et al., The Effects of Task Interruption and Information Presentation on Individual Decision Making, (1993), pp. 21-35.

Nardi, Bonne A. et al., Interaction and Outeraction: Instant Messaging in Action, (CSCW 2000), pp. 79-88.

Czerwinski, Mary et al., A Diary Study of Task Switching and Interruptions, (CHI 2004), Vienna, Austria, pp. 175-182.

Cutrell, Edward B. et al., Effects of Instant Messaging Interruptions on Computing Tasks, (CHI 2000), pp. 99-100.

\* cited by examiner

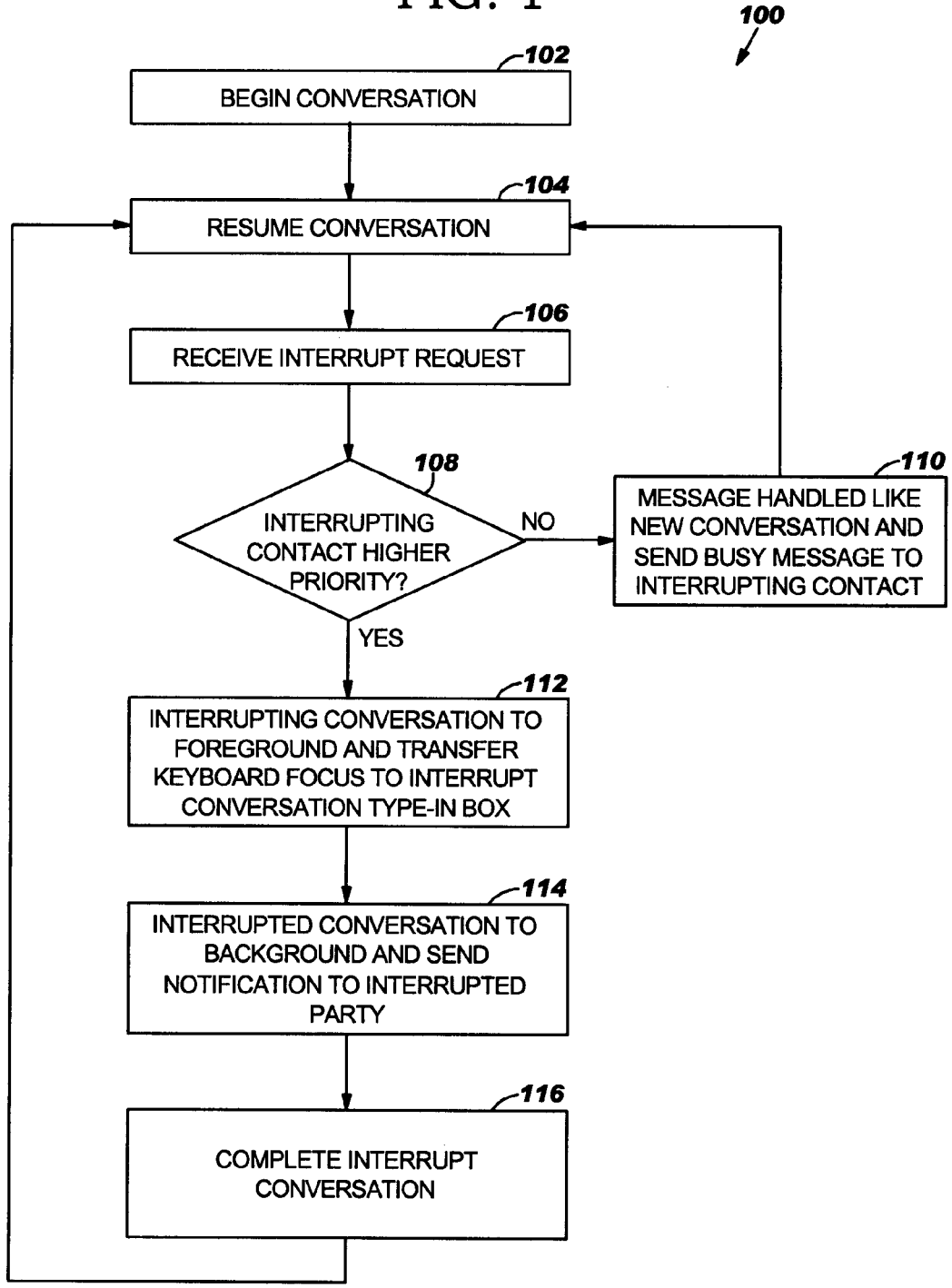

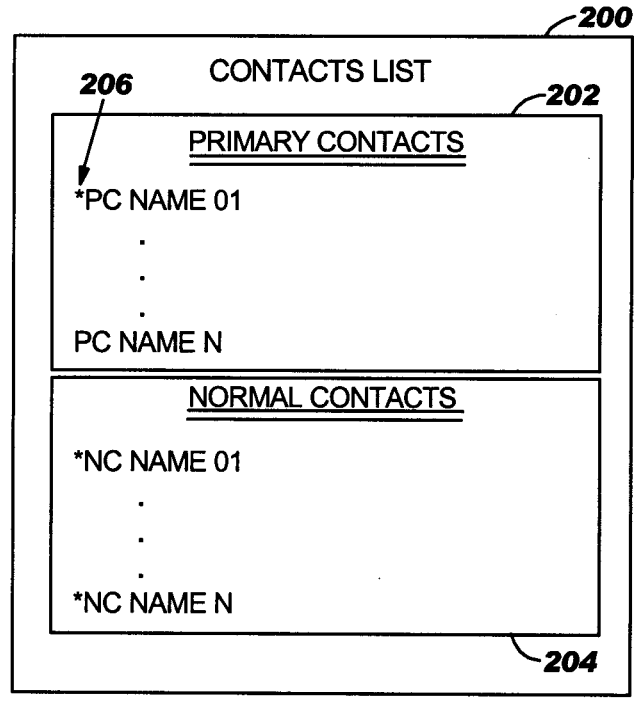

METHOD AND SYSTEM FOR MANAGING INTERRUPTS IN AN INSTANT MESSAGING APPLICATION

BACKGROUND OF INVENTION

The present invention relates to communications and more particularly to a method and system for managing interrupts in an instant messaging application, text messaging or similar communications application or functionality.

Instant messaging (IM) applications, such as Lotus® Same-time®, America Online® Instant Messaging or the like, for conducting real-time electronic conversations using real-time transmitted text are becoming more and more popular. Usage of these applications or communication methods is starting to reach a point where a user may typically be engaged in multiple electronic conversations simultaneously. Accordingly, interruptions from other users during conversations are becoming very common. Typically, with current IM applications, when a user or participant in an ongoing conversation is contacted by another user, the message from the other or interrupting user is displayed momentarily in the foreground of the interrupted user's desktop, display or monitor and then the message may be moved to the background of the desktop or display. The interrupted user may not have time to fully read and comprehend the message from the interrupting user to determine the importance of the message and what priority to give the message before the message is moved to the background. Even if the interrupted user did have time to read the message, he still must perform at least two time-consuming operations before he can respond to the interrupting user. First, proper etiquette suggests that the interrupted user should type a message to the other party or parties in the ongoing, interrupted IM conversation in-forming the other party or parties of the interruption. This may be involved and result in even more delay if the interrupted user was already typing a message and must now backspace over or delete the message. Secondly, to respond to the interrupting message, the interrupted user must also find the taskbar icon for the new or interrupting message, click on it with a computer pointing device or the like to activate or bring up the interrupting message in the foreground of the desktop or display and then focus or activate a cursor in the "type-in box" of the interrupting message to respond to the interrupting user.

Current IM applications do not provide a convenient way for an interrupted user to determine the importance of the interrupting message and whether the interruption needs immediate attention. Nor do current IM applications provide a means to automatically prevent or minimize interruptions of lower importance interrupting messages or to block any interruptions if desired by the user or participant. Current IM applications also do not provide means for automatically notifying non-contacted users or participants to an ongoing, interrupted IM conversation that an interruption has occurred with respect to at least one of the other participants.

SUMMARY OF INVENTION

In accordance with an embodiment of the present invention, a method for managing interrupts in an instant messaging application may include receiving an interrupt request from an interrupting contact or user during an instant messaging conversation between at least two contacts. The method may also include interrupting the instant messaging conversation in response to a predetermined one of the interrupting contact having a selected interrupt priority ranking relative to an interrupt priority ranking of each of the at least two contacts or an interrupting conversation having a higher priority ranking compared to an interrupt priority ranking of the instant messaging conversation.

In accordance with another embodiment of the present invention, a method for managing interrupts in an instant messaging application may include receiving an interrupt request from an interrupting contact during an instant messaging conversation between at least two contacts. The method may also include interrupting the instant messaging conversation based on a set of interrupt rules and sending an interrupt blocked message or the like to the interrupting contact in response to interrupts being selectively blocked.

In accordance with another embodiment of the present invention, a system for managing interrupts in an instant messaging application may include means for receiving an interrupt contact during an instant messaging conversation between at least two contacts. The system may also include a set of interrupt rules associated with the instant messaging application to control any interrupts to the instant messaging conversation between the at least two contacts.

In accordance with another embodiment of the present invention, a method of making a system for managing interrupts in an instant messaging application may include providing means for receiving an interrupt from an interrupting contact during an instant messaging conversation between two contacts. The method may also include forming a set of interrupt rules associated with the instant messaging conversation between the at least two contacts.

In accordance with another embodiment of the present invention, a computer-readable medium having computer-executable instructions for performing a method that may include receiving an interrupt request from an interrupting contact during an instant messaging conversation between at least two contacts. The method may also include interrupting the instant messaging conversation in response to a predetermined one of the interrupting contact having a selected interrupt priority ranking at least as high as an interrupt priority ranking of each of the at least two contacts or an interrupting conversation having a higher interrupt priority ranking compared to an interrupt priority ranking of the instant messaging conversation.

BRIEF DESCRIPTION OF DRAWINGS

FIG. 1 is a flow chart of an exemplary method for managing interrupts in an instant messaging application in accordance with an embodiment of the present invention.

FIG. 2 is an example of a contacts list for setting or selecting interrupt priority rankings for contacts or users in accordance with an embodiment of the present invention.

FIG. 3 is an example of a contacts list for setting or selecting interrupt priority rankings for contacts or users in accordance with another embodiment of the present invention.

DETAILED DESCRIPTION

Figure 4:
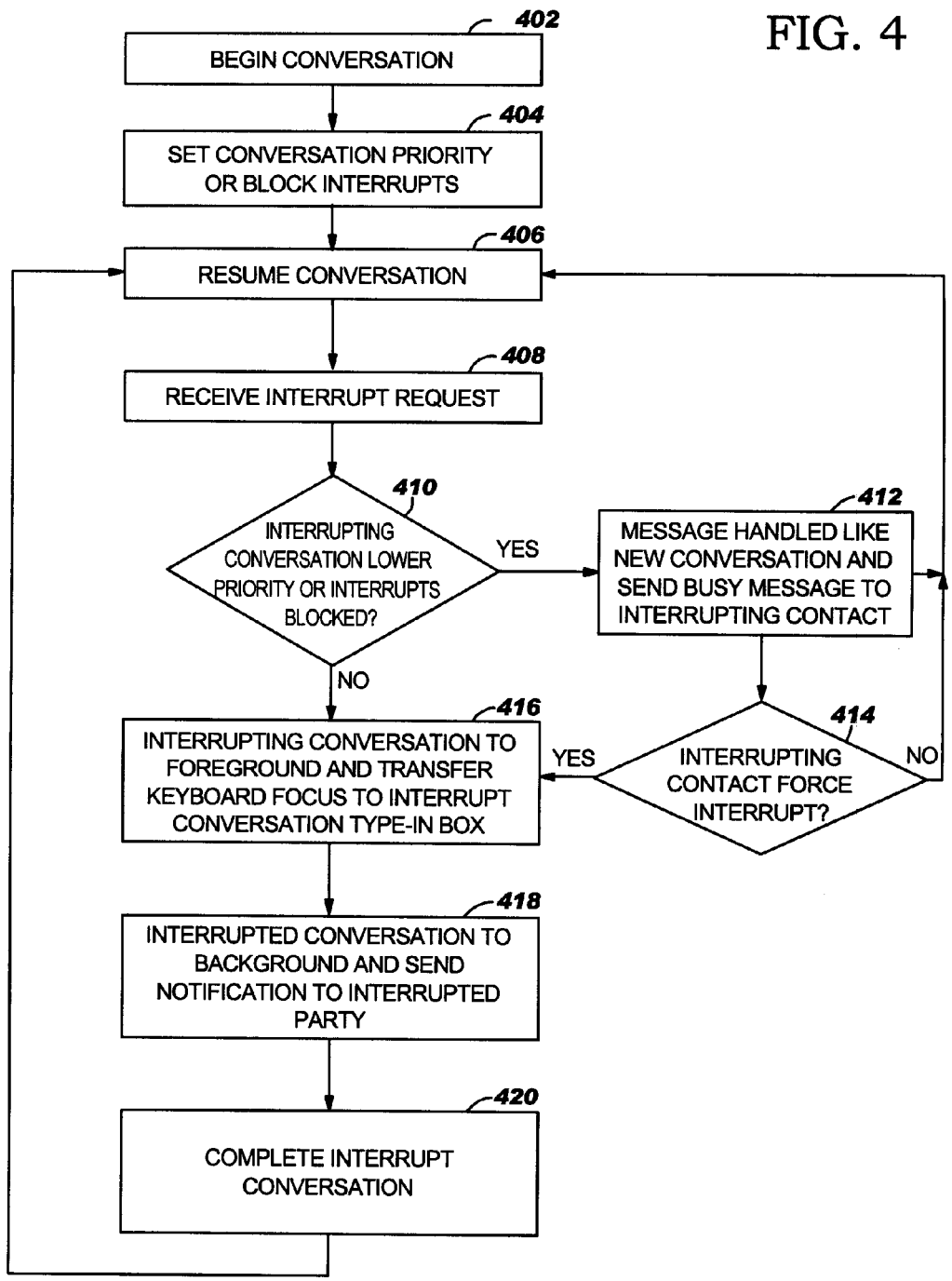
FIG. 4 is a flow chart of an exemplary method for managing interrupts in an instant messaging application in accordance with another embodiment of the present invention.

The following detailed description of preferred embodiments refers to the accompanying drawings which illustrate specific embodiments of the invention. Other embodiments having different structures and operations do not depart from the scope of the present invention.

FIG. 1 is a flow chart of an exemplary method 100 for managing interrupts in an instant messaging application or the like in accordance with an embodiment of the present invention. In block 102, an instant messaging conversation may begin between at least two contacts, users or participants. Instant messaging (IM) as used herein may include any type of real-time electronic messaging that may utilize the transmission of text messages or the like. IM may include but is not limited to Lotus® Sametime®, America Online® Instant Messaging or Instant Messenger®, Microsoft Network (MSN®) Messenger Service, Internet Relay Chat (IRC), text messaging or similar applications or functionality. The contacts, users or participants may be using any sort of communications device including an IM application or functionality. Examples of such communications devices may include, but are not limited to computer systems or personal computers (PCs), personal digital assistants (PDAs), cellular telephones or other wireless communications devices, wire line telephones or other wired communications devices or the like.

In block 104, the IM conversation may resume in the event of an interrupt as described below. In block 106, an interrupt request or the like from an interrupting contact or user may be received by one or more of the contacts or participants of the IM conversation. The interrupt request may be received by the communications device being used by the contact or participant to carry on the IM conversation. As discussed in more detail herein, the interrupt request may be processed by an IM application adapted to manage interrupts in accordance with an embodiment of the present invention and operating on a processor in the communications device.

In block 108, a determination may be made whether the interrupting contact has an interrupt priority ranking higher than, or at least as high as, a priority ranking of each of the at least two contacts, users or participants of the ongoing IM conversation. A priority ranking or interrupt priority ranking may be selected or set for contacts or users in a contacts list, buddy list or the like. For example, the contacts or users in the contacts list may be listed in order according to their respective interrupt priority ranking. The interrupt priority list may be represented as a graphical user interface (GUI) or the like as a simple auxiliary list to the main contact or buddy list.

FIG. 2 is an example of a contacts list 200 or buddy list for setting or selecting interrupt priority rankings for contacts or users in accordance with an embodiment of the present invention. The contacts list 200 may include a primary contacts list 202 and a normal contacts list 204. The primary contacts list 202 may be used to specify an interrupt priority ranking for selected users by listing users in order according to their respective interrupt priority ranking. The normal contacts list 204 may list all users or contacts alphabetically or in any other desired order. Interrupt priority rankings may or may not be set or selected for normal contacts and the default could be that normal contacts are blocked from interrupting ongoing IM conversations or given the lowest priority setting according to interrupt rules that may be operating on a system. The contacts list 200 may be presented to a user as a GUI to permit the user to arrange the contacts in the primary contacts list 202 according to interrupt priority rankings and to select or set a default interrupt priority for other contacts in the normal contacts list 204. Contacts with a higher interrupt priority ranking may interrupt IM conversations with a lower priority ranking or the same priority ranking depending upon any interrupt rules that may be operational. For example, interrupt rules may be dictate that each contact in an IM conversation must have a lower interrupt priority than an interrupting contact to permit the IM conversation to be interrupted. Alternatively, the interrupt rules may require that the contacts being interrupted have the same or a lower interrupt priority ranking.

The interrupt priority ranking may be automatically derived from a Lightweight Directory Access Protocol (LDAP) server or the like. This may be particularly useful in relatively large organizations that utilize an LDAP server or the like. The interrupt priority ranking may also be automatically derived from any electronic organizational directory or reporting chain that may be represented in a data processing system of an organization, such as IBM Blue Pages or the like.

The contact list GUI 200 may also include a symbol or indication associated with each contact to indicate when a contact is online and available to enter into an IM conversation. For example, an asterisk 206 or other symbol may appear next to a contacts name or identification in the contacts list 200 to indicate that the contact is online. The contact list GUI 200 may also include an indication if the contact is currently engaged in an IM conversation and with whom. For example, the asterisk 206 or other symbol may be color coded to indicate whether the contact is already engaged in an IM conversation and therefore busy or a different symbol may be used. Alternatively, the contacts name or identification may be colored coded or highlighted if busy and already engaged in an IM conversation.

FIG. 3 is an example of another contacts list 300 for setting or selecting interrupt priority rankings for contacts or users in accordance with another embodiment of the present invention. The contacts list 300 may be represented as a GUI that may include a table 302 with columns for indicating online status 304, contact name or identity 306 and interrupt priority ranking 308. In this embodiment, the contact may be assigned a numerical value that specifies the interrupt priority ranking. For example, if the contact has an interrupt priority of zero (0), then the contact cannot interrupt. Any contact may be able to interrupt the IM conversations between those other contacts in the list 300 that are assigned an interrupt priority numerical value the same or lower than the interrupting contact. Alternatively, an interrupting contact or user may only interrupt an IM conversation between other contacts in the list 300 that are assigned a lower interrupt priority numerical value. Interrupt rules may define under what circumstances or conditions interrupts may occur. The contact list GUI 300 may also include an indication of which contacts are idle and which may already be involved in an IM conversation. For example, a different symbol may be displayed in the online column 304 associated with each contact to represent the contact's status or the symbol may be color coded to represent different statuses.

Figure 5:
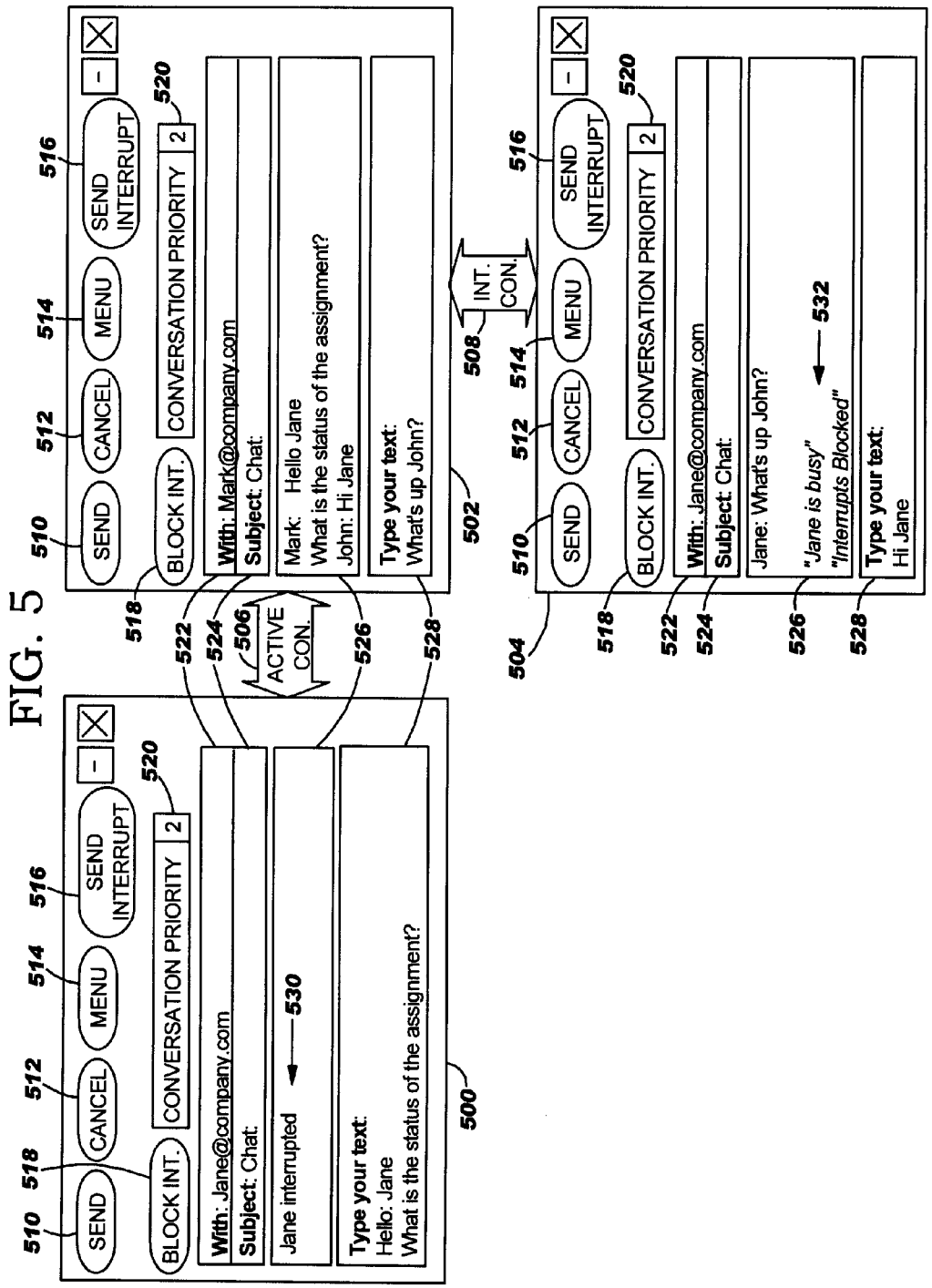
FIG. 5 is an example of graphical user interfaces (GUIs) or screen shots illustrating an instant messaging conversation and an interruption to the instant messaging conversation in accordance with one embodiment of the present invention.

Referring back to FIG. 1, block 108, if the interrupting contact does not have a higher or equivalent interrupt priority ranking (depending upon any interrupt rules) relative to an interrupt priority ranking of each of the at least two contacts engaged in an IM conversation, the method 100 may advance to block 110. In block 110, the interrupting message or conversation may be handled like a new IM conversation and a message may be sent to the interrupting contact that the contact or contacts are busy or engaged in another IM conversation and cannot be interrupted. If the interrupting contact does have a higher priority ranking in block 108 relative to the at least two contacts in an IM conversation, the method 100 may advance to block 112. In block 112, the ongoing IM conversation may be interrupted. A GUI representation of the interrupting IM conversation may be presented in a foreground of a desktop, display or monitor of the interrupted contact or contacts in response to the original IM conversation being interrupted. Examples of GUI representations or computer screen shots of an interrupted IM conversation and an interrupting IM conversation are illustrated in FIG. 5 and will be discussed in more detail with reference to FIG. 5 below. Any keystrokes on a keyboard, keypad or other input device may also be focused or directed to a type-in box or area associated with the interrupting IM conversation in the GUI. In block 114, the previously ongoing or interrupted IM conversation may be transferred to a background of a desktop, display or monitor of the interrupted contact or contacts. An interrupt notification, message or signal may be sent to any of the at least two contacts of the interrupted IM conversation that were not contacted by the interrupting contact in response to the original IM conversation being interrupted.

In block 116, the interrupting IM conversation may be completed. The method 100 may then return to block 104 and the original or interrupted IM conversation may resume if the original or interrupted contacts are still online and available. Messages may be automatically generated and sent to the other contacts to rejoin or continue the interrupted conversation. The method 100 may then continue as previously described if another interrupt request is received in block 106.

In another embodiment of the present invention, a determination may be made whether interrupts are blocked to an ongoing or existing IM conversation, either intentionally by one or more of the contacts or participants or by some other arrangement, such as interrupt rules that may be operable on a system. Such determination may be made before evaluating interrupt priority rankings in block 108 or before the existing IM conversation is interrupted in block 112 of FIG. 1. If interrupts are blocked, the IM conversation between the contacts will continue uninterrupted. In a further embodiment of the present invention, a message, notification or signal may be sent to the contacts of an ongoing IM conversation whether they wish to permit the interruption. The message or notification may identify the interrupting contact and the purpose or subject matter of the interruption IM conversation to assist the contacted user or users in deciding whether to permit the interruption.

FIG. 4 is a flow chart of an exemplary method 400 for managing interrupts in an instant messaging application in accordance with another embodiment of the present invention. In block 402, an IM conversation may begin between at least two contacts, users or participants. In block 404, a conversation priority for interrupt purposes may be set or selected or interrupts may be blocked by one or more of the contacts or participants. Some IM systems may be set up to permit contacts or users to configure or select conversation priorities or to block interrupts in advance of any IM conversations or selected IM conversations between selected contacts or participants. These configurations may form part of the interrupt rules.

In block 406, any interrupted IM conversation may be resumed in the event of an interrupting IM conversation. In block 408, an interrupt request may be received. In block 410, a determination may be made whether an interrupting IM conversation has a lower priority compared to an ongoing or existing IM conversation to be interrupted. Alternatively or in addition, a determination may be made whether interrupts are blocked with respect to the ongoing or existing IM conversation. If the interrupting IM conversation does have a lower priority ranking or interrupts are blocked in block 410, the method 100 may advance to block 412. In block 412, the new message or IM conversation attempting to interrupt the existing or ongoing IM conversation may be treated as a new IM conversation and a busy message or signal may be sent to the interrupting contact that the contact or contacts he is trying interrupt are busy and cannot be interrupted. The method 100 may then return to block 406 and the original IM conversation may resume or continue uninterrupted. In an alternative embodiment of the present invention, the interrupting contact may have an option to force an interruption of the existing IM conversation. In this embodiment a determination may be made in block 414 if the interrupting contact is forcing an interrupt. A notification or message may be displayed in a GUI presented to the interrupting contact asking if an interruption of the ongoing IM conversation should be forced or any priority or interrupt blocking overridden. If the interrupting contact selects not to force the interrupt or override the priority ranking or block, the method 400 may return to block 406 and the ongoing IM conversation may resume or continue uninterrupted. If the interrupting contact selects to force the interrupt or override the priority ranking or interrupt block, the method may advance to block 416.

In block 410, if the interrupting IM conversation has a higher priority ranking compared to the ongoing or existing IM conversation to be interrupted and/or interrupts are not blocked, the method 400 may advance to block 416. In block 416, the ongoing or existing IM conversation may be interrupted by the interrupting IM conversation. A GUI representation of the interrupting IM conversation may be presented to an interrupted contact in the foreground on a desktop of a display or monitor in response to the original or existing IM conversation being interrupted. Examples of GUI representations or computer screen shots of an interrupted IM conversation and an interrupting IM conversation are illustrated in FIG. 5 and will be discussed in more detail with reference to FIG. 5 below. Additionally, in block 416, any keystrokes on a keyboard, keypad or other input device may be focused or directed to a type-in box or area associated with the interrupting IM conversation in the GUI.

In block 418, the previously ongoing or interrupted IM conversation may be transferred to a background of a desktop, display or monitor of the interrupted contact or contacts. An interrupt notification, message or signal may be sent to any of the at least two contacts of the interrupted, original IM conversation that were not contacted by the interrupting contact in response to the original IM conversation being interrupted. In block 420, the interrupting IM conversation may be completed. The method 400 may then return to block 406 and the original or interrupted IM conversation may resume if the original or interrupted contacts are still online and available. Messages may be automatically generated and sent to the other contacts to rejoin or continue the interrupted conversation. The method 400 may then continue as previously described if another interrupt request is received in block 106.

In another embodiment of the present invention, the method 100 of FIG. 1 and the method 400 of FIG. 4 may be used in conjunction with one another or combined. For example, precedence may be set or selection may be made between (1) using or comparing an interrupt priority ranking of the interrupting contact relative to the interrupted contacts, and (2) using or comparing an interrupting priority ranking of the interrupting IM conversation relative to the interrupted IM conversation. The selection or precedence may form part of any interrupt rules or other operational parameters.

As previously mentioned, FIG. 5 is an example of graphical user interfaces (GUIs) 500, 502 and 504 or screen shots illustrating an active or ongoing instant messaging conversation 506 and an interruption or interrupting IM conversation 508 to the active or ongoing instant messaging conversation 506 in accordance with one embodiment of the present invention. Each of the GUIs 500, 502 and 504 may include a "SEND" radio button 510 or the like to transmit any IM messages or commands to control the IM system in response to the "SEND" button 510 being operated, and a "CANCEL" radio button 512 to cancel any IM messages, terminate any IM conversations or cancel or abort any commands, operations or the like, in response to the "CANCEL" button 512 being operated. Each of the GUIs 500, 502 and 504 may also include a "MENU" radio button 514 or the like that may present a menu or list of options in the GUI 500, 502 or 504 in response to the "MENU" button 514 being operated by a computer pointing device. The "MENU" button 514 may be used to configure the IM function according to a user's preferences, such as establish interrupt rules or set other parameters. In accordance with other embodiments of the present invention, each GUI 500, 502 and 504 may also include one or more of a "SEND INTERRUPT" radio button 516 or the like, a "BLOCK INTERRUPTS" radio button 518 and an input box 520 or the like to select or enter a "CONVERSATION PRIORITY." The "SEND INTERRUPT" radio button 516 or the like may be provided to selectively send an interrupting message or to force an interrupt after a busy or blocked notification as previously described. The "BLOCK INTERRUPTS" radio button 518 or the like may be operated by a user to block attempts to interrupt ongoing IM conversations between the user and other contacts. The "CONVERSATION PRIORITY" input box or the like may be used to select or input a numerical conversation priority ranking that may prevent interrupting IM conversations of a lower priority or no priority from interrupting. Alternatively, the conversation priority may be set or selected as a high (H) or low (L), or in a further embodiment, a high (H), medium (M) or low (L) conversation priority or any similar designation to accomplish a priority ranking.

Each GUI 500, 502 and 504 may also include a "With:" or "To:" line 522 to identify the other contacts or participants in an IM conversation. Each GUI may also include a "Subject:" line 524 that may be used to designate a subject matter or purpose of the IM conversation. The GUIs may also each include a text box 526 for messages sent to the participant or contact and a type-in or "Type your text:" box 528 where the participant or contact can type his messages to other users or participants. The focus or direction of keystrokes of the keyboard, keypad or other input device may be on the "Type in your text:" box 528 during an ongoing IM conversation unless the participant directs the focus to another portion of the GUI by pointing and clicking a pointing device, moving a cursor or similar known technique.

The GUI 500 illustrates a contact or participant "Mark" beginning an IM conversation with another contact or participant "Jane" by indicating Jane's address in the "With:" line 522 of GUI 500 and typing in a message to Jane in the "Type your text:" box 528. Before Jane can respond in GUI 502, the active IM conversation 506 may be interrupted by another contact "John" represented in GUI 504. If john's interrupt priority ranking is the same as or higher than that of Jane or Mark (depending upon any interrupt rules) and interrupts are not blocked by Mark or Jane, the active IM conversation 506 between Mark, GUI 500, and Jane, GUI 502, may be interrupted by John, GUI 504. A message or notification 530, such as "Jane Interrupted" may be sent to Mark, GUI 500. Alternatively, if Mark (GUI 500) and Jane (GUI 502) each have a higher interrupt priority ranking or the IM conversation between Mark and Jane has a higher interrupt priority ranking (depending upon any interrupt rules), the interrupt by John (GUI 504) may be blocked. John may receive a busy or blocked notification or message 532, such as "Jane is busy" or "Interrupts Blocked." The "Interrupts Blocked" message may also be sent in the event that either Mark or Jane has operated the "Block Interrupts" radio button 518. If permitted by the interrupt rules, John (GUI 504) may be permitted to force the interrupt or override the priority rankings by operating the "SEND INTERRUPT" button 516.

The GUIs 500, 502 and 504 are merely examples of GUIs that may be used in conjunction with methods and systems for managing interrupts in an instant message application or program in accordance with the present invention. Any layout or configuration may be utilized to facilitate the features and functions described herein and the present invention is not limited to any particular GUI layout, configuration or design.

Figure 6:
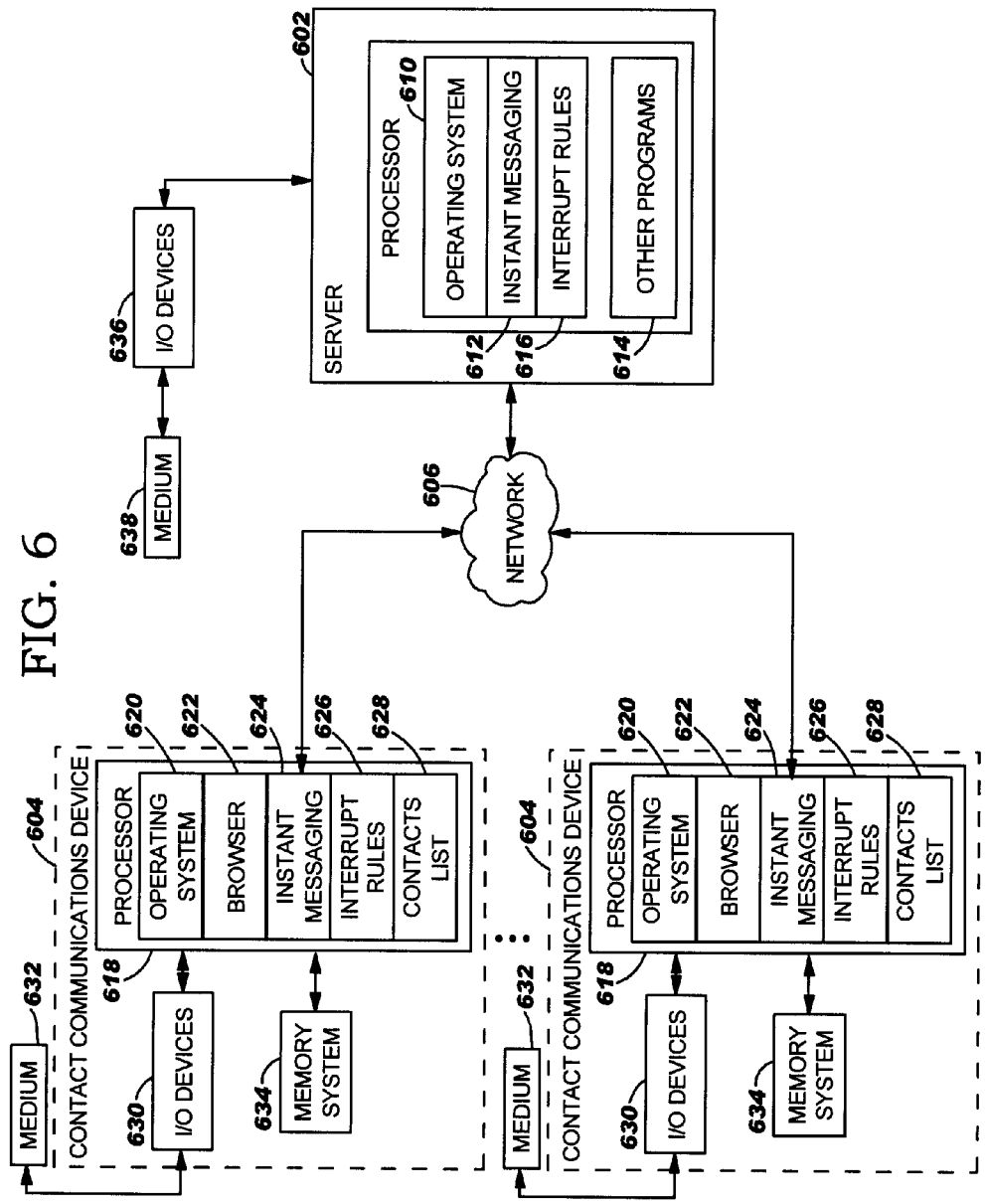
FIG. 6 is an example of a system for managing interrupts in an instant messaging application in accordance with an embodiment of the present invention.

FIG. 6 is an example of a system 600 for managing interrupts in an instant messaging application in accordance with an embodiment of the present invention. The system 600 may include at least one server 602. A user or contact communications device 604 may communicate with the server 602 via a communication network 606. Accordingly, user communications devices 604 may communicate with one another using instant messaging functionality or the like via the communication network 606 and the server 602. As previously discussed, the user or contact communication device may be any sort of wire line or wireless communications device that may have an IM application or functionality. The communication network 606 or medium may be the Internet or a private network, such as an intranet or the like. The communication network 606 or medium may be any communication system including by way of example, dedicated communication lines, telephone networks, and wireless data transmission systems, two-way cable systems, and customized computer networks, interactive kiosk networks, and the like.

The server 602 may be or include a processor 608. An operating system 610 may operate on the server 602 or processor 608 to control overall operation of the server 602. Application programs, such as an IM program or application 612 or the like and other programs 614 that may have specific functionality may operate on the processor 608 or server 602. The IM program or application 612 may include interrupt rules 616 similar to that previously described.

Each user or contact communications device 604 may include a processor 618. An operating system 620 may operate on the processor 618 to control overall operation of the user communication device 604. An Internet browser 622 or the like may be provided to communicate with other user communications devices 604 via the network 606 and server 602. An IM program or application 624 or the like may also be provided for communications between the user communications devices 604 similar to the functionality previously described with respect to methods 100 and 400 of FIGS. 1 and 4, respectively. The IM program or application 624 may be part of or form a module within the browser 622 or may be a separate program or application that may interface or function in association with the browser 622. Elements of the method 100 of FIG. 1 and method 400 of FIG. 4 may be embodied in the instant messaging programs or applications 624 and 612. Software or functionality to form GUI 200 of FIG. 2, GUI 300 of FIG. 3 or GUIs 500, 502 and 504 of FIG. 5 and to carry out the functions described with respect to the GUIs may be embodied in the instant messaging programs or applications 624 and 612 and the browser 622.

A set of interrupt rules 626 may be associated with the IM program or application 624 to control any interrupts to an instant messaging conversation between at least two users or contacts 604 similar to that previously described with respect to methods 100 and 400 of FIGS. 1 and 4, respectively.

A contact list 628 may also be associated with the instant messaging program or application 624. The contact list 628 may be similar to that described with respect to contact list 200 or 300 of FIGS. 2 and 3, respectively.

The user communications device 604 may also include multiple input devices, output devices or combination input/output devices 630. The input and output devices or combination I/O devices 630 permit a user to operate and interface with the communications device 604 and to control operation of the instant messaging program or application 624. The I/O devices 630 may also permit a user to enter or modify interrupt rules 626, add, delete and modify contacts in the contacts list 628, and set, select or edit interrupt priority rankings unless these are set by some other means or method, as previously described. The I/O devices 630 may include a keyboard and pointing device to control the IM functionality. The I/O devices 630 may also include disk drives, optical, mechanical, magnetic, or infrared input/output devices, modems or the like. The I/O devices 630 may be used to access a medium 632. The medium 632 may contain, store, communicate or transport computer-readable or computer executable instructions or other information for use by or in connection with a system, such as the user communication device 604 or computer system and system 600.

The user communications devices 604 may also include a memory system 634 to store application programs and data that may be used by the application programs, such as the IM program or application 624 or other programs.

The server 602 may also include multiple input devices, output devices or combination input/output devices 636. The input and output devices or combination I/O devices 636 permit a user or administrator to operate and interface with the server and to control operation of those instant messaging program or application components 612 operating on the server 602. The I/O devices 636 may be similar to the I/O devices 630. The I/O devices 636 may be used to access a medium 638. The medium 638 may contain, store, communicate or transport computer-readable or computer executable instructions or other information for use by or in connection with a system, such as the server 602 or system 600.

Elements of the present invention, such as methods 100 and 400 of FIGS. 1 and 4 respectively, GUIs 200, 300 and 500 of FIGS. 2, 3 and 5, respectively, and system 600 of FIG. 6, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system, such as system 600 of FIG. 6. Examples of such a medium may be illustrated in FIG. 6 as I/O devices 630 and 636 or medium 632 and 638. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "down-loaded" through a network, such as the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer implemented method for managing interrupts in an instant messaging application, comprising:
    receiving an interrupt request from an interrupting contact during an ongoing instant messaging conversation between at least two contacts each using a communications device, wherein the interrupt request is received by the communications device of at least one of the at least two contacts;
    determining at least one of whether the interrupting contact has an interrupt priority ranking associated with the interrupting contact in a contacts list of the communications device receiving the interrupt request that is higher than, or at least as high as, an interrupt priority ranking of each of the at least two contacts participating in the ongoing instant messaging conversation and whether an interrupting conversation has a higher priority compared to a priority of the ongoing instant messaging conversation set by at least one of the at least two contacts participating in the ongoing instant messaging conversation in their communications device;
    interrupting the ongoing instant messaging conversation in response to a predetermined one of the interrupt priority ranking of the interrupting contact being higher than, or at least as high as, the interrupt priority ranking of each of the at least two contacts participating in the ongoing instant messaging conversation and the interrupting conversation having a higher interrupt priority ranking compared to the interrupt priority ranking of the ongoing instant messaging conversation; and
    sending a contact busy message to the interrupting contact in response to one of the interrupting contact having an interrupt priority ranking no higher than each of the at least two contacts or the interrupting conversation having an interrupt priority ranking no higher than the interrupt priority ranking of the instant messaging conversation.

2. The computer implemented method of claim 1, further comprising selecting a precedence between interrupting the instant messaging conversation based on the interrupt priority ranking of the interrupting contact relative to the interrupt priority ranking of each of the at least two contacts and the interrupt priority ranking of the interrupting conversation relative to the interrupt priority ranking of the instant messaging conversation.

3. The computer implemented method of claim 1, further comprising:
    presenting a graphical user interface (GUI) representation of the interrupting conversation in a foreground of a display in response to interrupting the instant messaging conversation; and
    transferring a keyboard focus to a type-in box of the interrupting conversation in response to interrupting the instant messaging conversation.

4. The computer implemented method of claim 1, further comprising presenting a graphical user interface (GUI) representation of the instant messaging conversation in a background of a display in response to interrupting the instant messaging conversation.

5. The computer implemented method of claim 1, further comprising sending an interrupt notification to any of the at least two contacts of the instant messaging conversation not contacted by the interrupting contact in response to interrupting the instant messaging conversation.

6. The computer implemented method of claim 1, further comprising resuming the instant messaging conversation in response to the interrupting conversation being completed.

7. The computer implemented method of claim 1, further comprising setting an instant messaging conversation priority.

8. The computer implemented method of claim 1, further comprising selectively blocking interrupts.

9. The computer implemented method of claim 8, further comprising overriding an interrupts block.

10. The computer implemented method of claim 1, further comprising assigning an interrupt priority ranking to all contacts in an instant messaging contacts list in a user's communications device.

11. The computer implemented method of claim 10, wherein assigning an interrupt priority ranking comprises one of assigning the interrupt priority ranking by placing all contacts in a predetermined order in the contact list or auxiliary contact list on the user's communications device and by assigning a contact priority number to each contact in the contact list.

12. The computer implemented method of claim 1, further comprising deriving an interrupt priority ranking for each contact from a Lightweight Directory Access Protocol (LDAP) or from a reporting chain.

13. A computer implemented method for managing interrupts in an instant messaging application, comprising:
   receiving an interrupt request from an interrupting contact during an ongoing instant messaging conversation between at least two contacts each using a communications device, wherein the interrupt request is received by the communications device of at least one of the at least two contacts;
   interrupting the instant messaging conversation based on a set of interrupt rules and independent of a location of the communications device being used by each of the at least two contacts, wherein interrupting the instant messaging conversation based on the set of interrupt rules comprises:
      permitting the ongoing instant messaging conversation to be interrupted in response to interrupts being selectively permitted; and
      determining that the interrupting conversation has an interrupt priority ranking higher than an interrupt priority ranking of the ongoing conversation set by at least one of the at least two contacts participating in the ongoing instant messaging conversation in their communications device;
   sending an interrupt notification to any of the at least two contacts of the instant messaging conversation not contacted by the interrupting contact in response to interrupting the instant messaging conversation; and
   sending an interrupt blocked message to the interrupting contact in response to interrupts being selectively blocked.

14. The computer implemented method of claim 13, further comprising presenting a GUI representation of the interrupting conversation in a foreground of a display in response to interrupting the instant messaging conversation.

15. A computer implemented method for managing interrupts in an instant messaging application, comprising:
   receiving an interrupt request from an interrupting contact or user during an ongoing instant messaging conversation between at least two contacts or users each using a communications device, wherein the interrupt request is received by the communications device of at least one of the at least two contacts;
   determining whether the interrupting contact or user has an interrupt priority ranking in a contacts list of the communications device receiving the interrupt request that is higher than, or at least as high as, a priority ranking of each of the at least two contacts or users in the contacts list participating in the ongoing instant messaging conversation set by at least one of the at least two contacts participating in the ongoing instant messaging conversation in their communications device, the contacts list being divided into a primary contacts list and a normal contacts list, wherein the primary contacts list permits a user to specify the interrupt priority ranking for selected contacts by listing contacts in an order according to their respective interrupt priority order and wherein the normal contacts lists contacts alphabetically; and
   interrupting the ongoing instant messaging conversation in response to the interrupt priority ranking of the interrupting contact or user being higher than, or at least as high as, each of the at least two contacts or users.

16. The computer implemented method of claim 15, further comprising blocking the contacts on the normal contacts list and that are not on the primary contacts list from interrupting the ongoing instant messaging conversation.

17. The computer implemented method of claim 15, further comprising indicating in the contacts list when a contact is online and available to enter into a new instant messaging conversation.

18. The computer implemented method of claim 15, further comprising representing the contacts list as a graphical user interface including a table comprising one column for indicating an online status of each contact in the contacts lists and another column for an interrupt priority ranking of each contact.

19. The computer implemented method of claim 18, further comprising assigning a numerical value to each contact that specifies the interrupt priority ranking of each contact.

20. The computer implemented method of claim 15, further comprising presenting a graphical user interface to each participant in an active instant messaging conversation, wherein the graphical user interface comprises an input means to enter or select a priority of the active instant messaging conversation.

21. A system for managing interrupts in an instant messaging application, comprising:
   a communications device for receiving an interrupt from an interrupting contact during an instant messaging conversation between a contact using the communications device and at least one other contact using another communications device;
   a module stored in a memory of the communications device and operable on the communications device to determine at least one of whether the interrupting contact has an interrupt priority ranking associated with the interrupting contact in a contacts list of the communications device receiving the interrupt request that is higher than, or at least as high as, an interrupt priority ranking of each of the at least two contacts participating in the ongoing instant messaging conversation and whether an interrupting conversation has a higher priority compared to a priority ranking of the ongoing instant messaging conversation set by at least one of the at least two contacts participating in the ongoing instant messaging conversation, each contact in the contacts list having been assigned a numerical value that specifies the interrupt priority ranking of the contact; and
   another module stored in the memory of the communications device and operable on the communications device to interrupt the ongoing instant messaging conversation in response to a predetermined one of the interrupt priority ranking of the interrupting contact being higher than, or at least as high as, the interrupt priority ranking of each of the at least two contacts participating in the ongoing instant messaging conversation and the interrupting conversation having a higher interrupt priority ranking compared to the interrupt priority ranking of the ongoing instant messaging conversation.

22. The system of claim 21, further comprising a set of interrupt rules, wherein the set of interrupt rules comprise a rule permitting the instant messaging conversation to be interrupted in response to interrupts being selectively permitted and the interrupting contact having an interrupt priority ranking at least as high as an interrupt priority ranking of each of the contacts and independent of the location of the communications devices being used by each of contacts.

23. The system of claim 21, further comprising a set of interrupt rules, wherein the set of interrupt rules comprises a rule permitting the instant messaging conversation to be interrupted in response to interrupts being selectively permitted and the interrupting conversation having a higher interrupt priority ranking than an interrupt priority ranking of the instant messaging conversation and independent of the location of a communications device being used by each of the contacts.

24. The system of claim 21, further comprising a set of interrupt rules, wherein the set of interrupt rules comprises a rule permitting interruption of the instant messaging conversation in response to a predetermined one of, one of the interrupting contact having a selected interrupt priority ranking at least as high as a interrupt priority ranking of each of the contacts, or the interrupting conversation having an interrupt priority ranking at least as high as an interrupt priority ranking of the instant messaging conversation.

25. The system of claim 21, further comprising means for presenting a GUI to a user to set a conversation priority.

26. A non-transitory computer readable storage medium having computer usable program code embodied therewith for managing interrupts in an instant messaging application, the computer readable storage medium comprising:
  computer usable program code configured to receive an interrupt request from an interrupting contact or user during an ongoing instant messaging conversation between at least two contacts or users;
  computer usable program code configured to determine at least one of whether the interrupting contact has an interrupt priority ranking associated with the interrupting contact in a contacts list of the communications device receiving the interrupt request that is higher than, or at least as high as, an interrupt priority ranking of each of the at least two contacts participating in the ongoing instant messaging conversation and whether an interrupting conversation has a higher priority compared to a priority of the ongoing instant messaging conversation set by at least one of the at least two contacts participating in the ongoing instant messaging conversation; and
  computer usable program code configured to interrupt the ongoing instant messaging conversation in response to a predetermined one of the interrupt priority ranking of the interrupting contact being higher than, or at least as high as, the interrupt priority ranking of each of the at least two contacts participating in the ongoing instant messaging conversation and the interrupting conversation having a higher interrupt priority ranking compared to the interrupt priority ranking of the ongoing instant messaging conversation; and
  computer usable program code configured to send a contact busy message to the interrupting contact in response to one of the interrupting contact having an interrupt priority ranking no higher than each of the at least two contacts or the interrupting conversation having an interrupt priority ranking no higher than the interrupt priority ranking of the instant messaging conversation.

27. The non-transitory computer readable storage medium of claim 26, further comprising:
  computer usable program code configured to present a graphical user interface (GUI) representation of the interrupting conversation in a foreground of a display in response to interrupting the instant messaging conversation; and
  computer usable program code configured to transfer a keyboard focus to a type-in box of the interrupting conversation in response to interrupting the instant messaging conversation.

28. The non-transitory computer readable storage medium of claim 26, further comprising computer usable program code configured to send an interrupt notification to any of the at least two contacts of the instant messaging conversation not contacted by the interrupting contact in response to interrupting the instant messaging conversation.

29. The non-transitory computer readable storage medium of claim 26, further comprising computer usable program code configured to presenting a GUI to a user to set an instant messaging conversation priority.

* * * * *